(12) United States Patent
Kavadeles

(10) Patent No.: US 7,469,690 B1
(45) Date of Patent: *Dec. 30, 2008

(54) METHOD AND SYSTEM FOR SUPERCHARGING A VEHICLE ENGINE

(75) Inventor: Bill Kavadeles, Carlsbad, CA (US)

(73) Assignee: High Performance Systems, LLC, Santa Ana, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/581,025

(22) Filed: Oct. 13, 2006

Related U.S. Application Data

(63) Continuation of application No. 11/036,572, filed on Jan. 13, 2005, now Pat. No. 7,137,384.

(51) Int. Cl.
  *F02B 29/04* (2006.01)
  *F02B 33/00* (2006.01)
  *F02B 27/02* (2006.01)
  *F02M 35/00* (2006.01)
  *F02M 35/10* (2006.01)

(52) U.S. Cl. .............. 123/559.1; 123/563; 123/184.49

(58) Field of Classification Search .............. 123/559.1, 123/563–564, 184.42, 184.21, 184.24, 184.49, 123/184.61, 195 R, 195 A
  See application file for complete search history.

(56) References Cited

U.S. PATENT DOCUMENTS

| | | | | |
|---|---|---|---|---|
| 2,963,006 A | * | 12/1960 | Karde | 123/65 BA |
| 3,161,182 A | * | 12/1964 | Albinson et al. | 123/65 BA |
| 3,400,695 A | * | 9/1968 | Zaruba | 123/65 R |
| 4,028,892 A | * | 6/1977 | Hinkle | 123/65 BA |
| 4,653,439 A | * | 3/1987 | Desai et al. | 123/65 BA |
| 5,544,486 A | * | 8/1996 | Lu | 60/599 |
| 5,544,629 A | | 8/1996 | Ohata et al. | 123/184.61 |
| 5,911,211 A | | 6/1999 | Uchida | 123/559.1 |
| 6,029,637 A | | 2/2000 | Prior | 123/559.1 |
| 6,079,394 A | | 6/2000 | Abthoff et al. | 123/559.1 |
| 6,604,514 B1 | | 8/2003 | Englund et al. | 123/559.1 |
| 6,837,195 B2 | | 1/2005 | Suwazono | 123/559.1 |
| 6,923,166 B2 | | 8/2005 | Barnes et al. | 123/559.1 |
| 2005/0139198 A1 | | 6/2005 | Park | 123/559.1 |
| 2005/0172919 A1 | | 8/2005 | Ozaki et al. | 123/559.1 |
| 2005/0263143 A1 | | 12/2005 | Matsuoka et al. | |

FOREIGN PATENT DOCUMENTS

EP  518725 A1 * 12/1992 ............ 123/184.49

* cited by examiner

*Primary Examiner*—Thai-Ba Trieu
(74) *Attorney, Agent, or Firm*—Farjami & Farjami LLP

(57) ABSTRACT

There is provided a supercharger system for supercharging a vehicle engine includes a first lower intake manifold adapter attached to the vehicle engine. The supercharger system further includes a second lower intake manifold adapter attached to the vehicle engine. The first and second lower intake manifold adapters can be attached to respective first and second cylinder heads of the vehicle engine. The supercharger system further includes a plate situated between the first and the second lower intake manifold adapter, where the plate is adapted to receive a supercharger on a bottom surface of the plate. The supercharger provides compressed air that flows through the first and the second lower intake manifold adapter to the vehicle engine. The supercharger system further includes an upper manifold plenum chamber situated over the plate, where the upper manifold plenum chamber receives the compressed air from the supercharger.

15 Claims, 7 Drawing Sheets

METHOD AND SYSTEM FOR SUPERCHARGING A VEHICLE ENGINE

RELATED APPLICATIONS

This application is a continuation of U.S. application Ser. No. 11/036,572, filed Jan. 13, 2005 now U.S. Pat. No. 7,137,384, which is related to U.S. patent application Ser. No. 11/036,545, filed Jan. 13, 2005, which is incorporated by reference in its entirety and made part of the present application.

BACKGROUND OF THE INVENTION

1. Field of the Invention

The present invention relates generally to internal combustion engines. More particularly, the present invention relates to apparatus for supercharging internal combustion engines.

2. Related Art

Superchargers have become popular in recent years as an addition to internal combustion engines as a result of cost efficiency, reliability, and performance. A supercharger is basically a compressor that creates "boost" by forcing more air into the cylinders of the engine than would naturally be drawn in during the engine's intake stroke. By way of background, "boost," which is typically measured in psi (pounds per square inch), refers to the additional amount of air pressure that is forced into the air intake of the engine to overcome the vacuum force that is naturally created by the engine's air intake. By creating boost, the supercharger forces a denser fuel/air charge into the engine's combustion chamber, which creates more horsepower.

In a conventional supercharger system, the supercharger is typically driven by the crankshaft of the engine via a belt and is often side-mounted on the engine. In such system, compressed air that exits the side-mounted supercharger is coupled to the engine's intake manifold by ducting. However, the ducting associated with the side-mounted supercharger can act as a megaphone that can amplify sound generated by the supercharger to an undesirably high level.

Also, many existing vehicle models have confined engine compartments with low vehicle hood clearance, which provides very little space to mount additional components, such as superchargers. As a result, conventional supercharger systems, which employ side-mounted superchargers, cannot be installed in many vehicle models. Additionally, the low vehicle hood clearance in many current vehicle models prevents superchargers in conventional supercharger systems from being mounted on top of the engine without having to modify the vehicle hood. Furthermore, a supercharger discharges compressed air at a high temperature, which can reduce fuel efficiency of the vehicle engine. However, the confined engine compartments of many existing vehicles models severely limits the space available for cooling devices that may be employed to reduce the temperature of compressed that exits the supercharger.

Thus, there is an intense need for supercharger systems that can overcome the disadvantages of the conventional supercharger systems, and that can increase performance, reduce emissions, decrease fuel consumption, reduce sound and decrease the temperature of compressed air that exits the supercharger system.

SUMMARY OF THE INVENTION

The present invention is directed to modular supercharger system. More specifically, the invention provides a supercharger system for supercharging a vehicle engine, which can increase performance, reduce emissions, decrease fuel consumption, reduce sound and decrease the temperature of compressed air that exits the supercharger system.

In one aspect, a supercharger system for supercharging a vehicle engine includes a first lower intake manifold adapter attached to the vehicle engine. The supercharger system further includes a second lower intake manifold adapter attached to the vehicle engine. The first lower intake manifold adapter can be attached to a first cylinder head of the vehicle engine and the second lower intake manifold adapter can be attached to a second cylinder head of the vehicle engine. The supercharger system further includes a mounting plate situated between the first and the second lower intake manifold adapter, where the plate is adapted to receive a supercharger on a bottom surface of the plate.

In the supercharger system, the supercharger provides compressed air that flows through the first and the second lower intake manifold adapter to the vehicle engine. The supercharger system further includes an upper manifold plenum chamber situated over the plate, where the upper manifold plenum chamber receives the compressed air from the supercharger. The plate has an opening to allow the compressed air to flow from the supercharger into the upper manifold plenum chamber. The first lower intake manifold adapter has a number of passageways for receiving the compressed air from the upper manifold plenum chamber.

These and other aspects of the present invention will become apparent with further reference to the drawings and specification, which follow. It is intended that all such additional systems, features and advantages be included within this description, be within the scope of the present invention, and be protected by the accompanying claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present invention is directed to modular supercharger system. The present invention may be described herein in terms of functional block components and various processing steps. It should be appreciated that such functional blocks may be realized by any number of hardware or software components configured to perform the specified functions. It should be further appreciated that the particular implementations shown and described herein are merely examples and are not intended to limit the scope of the present invention in any way.

Figure 1:
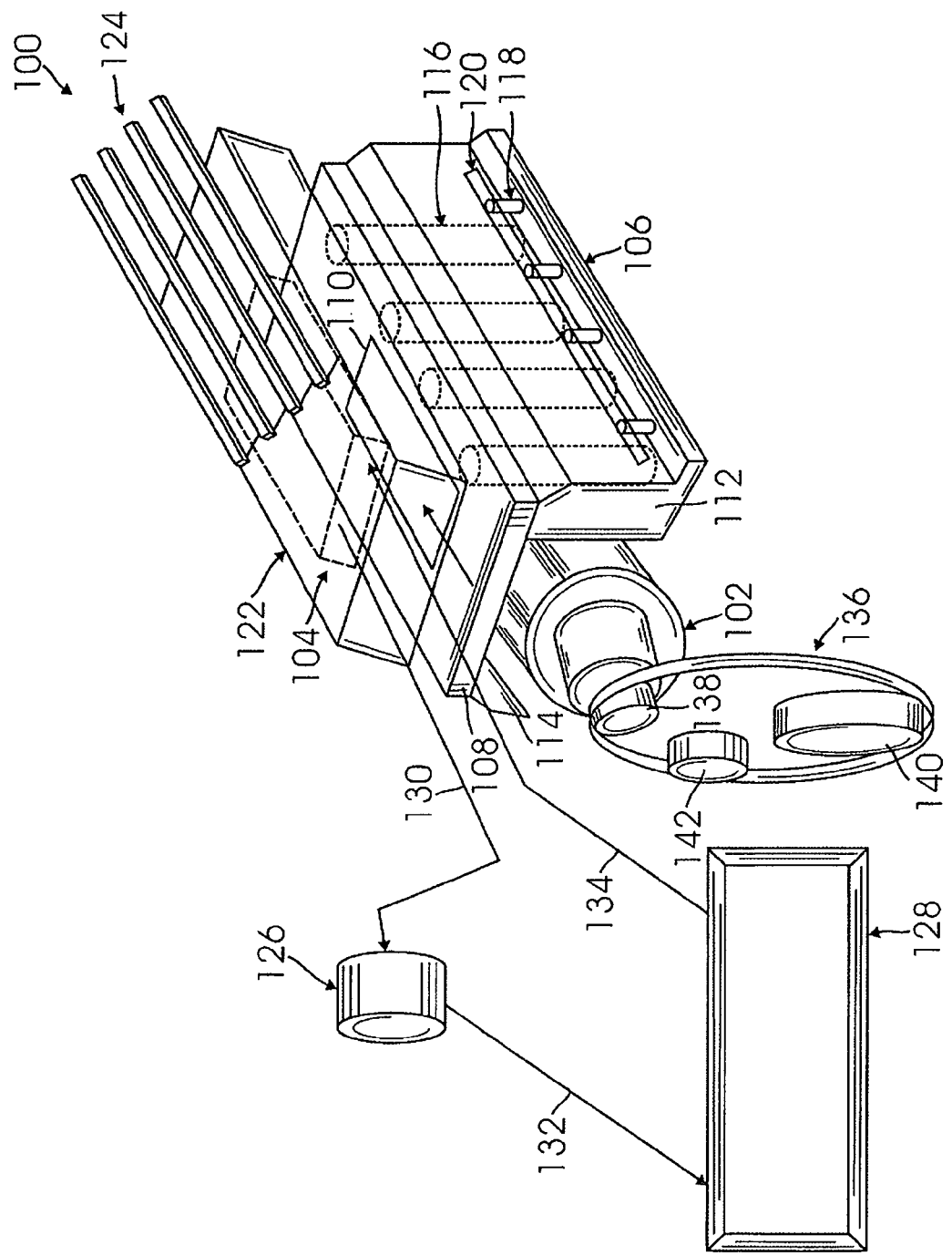
FIG. 1 illustrates a diagram of a modular supercharger system according to one embodiment of the present invention.

FIG. 1 shows a diagram of modular supercharger system 100 according to one embodiment of the present invention. Modular supercharger system 100 can be connected to an internal combustion vehicle engine (not shown in FIG. 1), such as a gasoline or diesel vehicle engine, to supercharge such vehicle engine. In one embodiment, modular supercharger system 100 may be connected to a vehicle engine having four or more cylinders. Modular supercharger system 100 uses a modular design including supercharger 102, lower intake manifold adapters 112 and 114, mounting plate 108, upper manifold plenum chamber 122, and an effective cooling system to increase performance, reduce emissions, and decrease fuel consumption of the vehicle engine. Supercharger system 100 also utilizes a cooling system component (i.e. internal heat exchanger 104) to reduce the level of sound that is generated by the supercharger.

Modular supercharger system 100 includes supercharger 102 for providing compressed air to cylinder intake valves (not shown in FIG. 1) of the vehicle engine. Supercharger 102 can be a "Roots" rotating element supercharger, a screw rotating element supercharger, a centrifugal compressor, a rotary helical element compressor, or an air pump. Modular supercharger system 100 also includes lower intake manifold assembly 106, which replaces the intake manifold (not shown in FIG. 1) of the vehicle engine during installation of modular supercharger system 100. Lower intake manifold assembly 106 can be attached to the vehicle engine cylinder heads (not shown in FIG. 1) after the intake manifold of the vehicle engine has been removed. Lower intake manifold assembly 106 includes mounting plate 108 for attaching supercharger 102 to lower intake manifold assembly 106. For example, supercharger 102 can be mounted over the vehicle engine on a bottom surface of mounting plate 108 such that compressed air exits supercharger 102 through opening 110 in mounting plate 108. Mounting plate 108 may comprise machined aluminum. In other embodiments, mounting plate 108 may comprise cast aluminum, cast iron, steel, or composite materials.

Lower intake manifold assembly 106 also includes lower intake manifold adapters 112 and 114 for supporting mounting plate 108 and upper manifold plenum chamber 122 and for providing supercharged compressed air to cylinder intake valves (not shown in FIG. 1) of the vehicle engine via core passageways 116. Lower intake manifold adapter 112 can be attached to one vehicle engine cylinder head (not shown in FIG. 1) and lower intake manifold adapter 114 can be attached to a second vehicle engine cylinder head. Mounting plate 108 can be attached to lower intake manifold adapters 112 and 114 to allow supercharger 102 to be situated between lower intake manifold adapters 112 and 114 in an updraft configuration. In the updraft configuration, compressed air is discharged from supercharger 102 in an upward direction (i.e. in a direction away from the vehicle engine). It is noted that although only a portion of lower intake manifold adapter 114 is shown in FIG. 1, lower intake manifold adapter 114 is substantially a mirror image of lower intake manifold adapter 112.

Lower intake manifold adapters 112 and 114 may comprise machined aluminum. In other embodiments, lower intake manifold adapters 112 and 114 may comprise cast aluminum, cast iron, steel, or composite materials. Lower intake manifold adapters 112 and 114 each include core passageways 116 for providing compressed air to respective cylinder intake valves of the vehicle engine. For example, lower intake manifold adapters 112 and 114 can each include four core passageways 116. In one embodiment, lower intake manifold adapters 112 and 114 may each include three core passageways 116. Lower intake manifold adapters 112 and 114 also include fuel injectors 118 for delivering fuel to respective vehicle engine cylinders (not shown in Figure). For example, lower intake manifold adapters 112 and 114 can each include four fuel injectors 118. In one embodiment, lower intake manifold adapters 112 and 114 may each include three fuel injectors 118 for 6 cylinder applications and 2 injectors for 4 cylinder applications. The size of fuel injectors 118 may be selected to achieve an appropriate fuel flow rate to meet a particular vehicle engine application maximizing fuel economy with reduced exhaust emissions and enhanced engine performance.

Fuel injectors 118 are coupled to fuel rail 120, which is coupled to a vehicle fuel pump (not shown in FIG. 1) via a vehicle fuel regulator (not shown in FIG. 1). In one embodiment, where a return-type electronic fuel injection system is used to supply fuel to the vehicle engine, a pneumatic vacuum/pressure controlled regulator may be coupled to fuel rail 120 to provide increased fuel rail pressure under boost, which provides more effective fuel atomization and, consequently, increased fuel economy and reduced risk of engine detonation by allowing fuel enrichment that is required under boost conditions.

Modular supercharger system 100 further includes upper manifold plenum chamber 122 for receiving compressed air from supercharger 102 and for housing internal heat exchanger 104, which cools the compressed air that enters upper manifold plenum chamber 122. Upper manifold plenum chamber also directs the cooled compressed air into intake valves (not shown in FIG. 1) of the vehicle engine via core passageways 116 in lower intake manifold adapters 112 and 114. Upper manifold plenum chamber 122 can be attached to mounting plate 108 and may comprise machined aluminum. In other embodiments, upper manifold plenum chamber 122 may comprise cast aluminum, cast iron, steel, or composite materials. Upper manifold plenum chamber 122 includes heat sink fins 124, which are formed in the top surface of upper manifold plenum chamber 122. Heat sink fins 124 can dissipate heat from compressed air received from supercharger 102 and can also dissipate heat conducted through lower intake manifold adapters 112 and 114. Heat sink fins 124 can dissipate heat through forced ram air that is ducted across heat sink fins 124 as a result of vehicle movement.

Modular supercharger system 100 further includes a cooling system for reducing the temperature of compressed air that is discharged from supercharger 102. The cooling system can be a liquid-to-air cooling system. In one embodiment, the cooling system may be an air-to-air cooling system. The cooling system includes internal heat exchanger 104 for cooling compressed air that is discharged from supercharger 102. Internal heat exchanger 104 can be attached to upper manifold plenum chamber 122 such that internal heat exchanger 104 is situated over opening 110 in mounting plate 108. Internal heat exchanger 104 and mounting plate 108 can form an appropriately tight seal such that substantially all of the compressed air discharged from supercharger 102 through opening 110 must pass through internal heat exchanger 104 before flowing though core passageways 116 in lower intake manifold adapters 112 and 114. Also, since internal heat exchanger 104 is situated directly over supercharger 102 in upper manifold plenum chamber 122, internal heat exchanger 104 also acts as a muffler to reduce the level of sound that is generated by supercharger 102.

Internal heat exchanger 104 may be a radiator-type cooling device or other appropriate type of cooling device and may be attached to upper manifold plenum chamber 122 by using bolts, screws, or other type of fastening devices. Internal heat exchanger 104 can include an array of passageways (not shown in FIG. 1) for circulation of fluid within internal heat exchanger 104. Internal heat exchanger 104 may further include fins to assist in heat exchange between compressed air exiting supercharger 102 and the fluid circulating in internal heat exchanger 104. Internal heat exchanger 104 also includes input and output ports (not shown in FIG. 1) to allow fluid to enter and exit internal heat exchanger 104. In one embodiment, internal heat exchanger 104 may be an air-to-air heat exchanger that can utilize air circulating in internal heat exchanger 104 to transfer heat from compressed air exiting supercharger 102.

By cooling the supercharged compressed air that is discharged from supercharger 102 before it (i.e. the compressed air) reaches the cylinder intake valves of the vehicle engine, a cooling system including internal heat exchanger 104 can advantageously increase the horsepower of the vehicle engine and reduce risk of engine detonation. By way of example, depending on ambient temperature in the vehicle engine compartment, internal heat exchanger 104 can cause a decrease in temperature of compressed air from supercharger 102 of between approximately 30.0° F. (degrees Fahrenheit) and approximately 60.0° F., which can advantageously result in an increase of between approximately 20.0 horsepower and approximately 35.0 horsepower. By reducing the temperature of compressed air discharged from supercharger 102, internal heat exchanger 104 can also advantageously cause an increase in vehicle fuel economy by providing the cylinder intake valves of the vehicle engine with cooler compressed air and reduce exhaust emissions and the risk of engine detonation.

The cooling system of modular supercharger system 100 furthers include pump 126 for pumping fluid through the cooling system. In an embodiment using an air-to-air cooling system, pump 126 may pump air through the cooling system. Pump 126 is coupled to internal heat exchanger 104 by conduit 130 and can be a 12.0 vdc coolant pump, such as a centrifugal, diaphragm, or rotary vane 12.0 vdc coolant pump. Pump 126 may be controlled by a microprocessor chip (not shown in FIG. 1). The cooling system of modular supercharger system 100 further includes external heat exchanger 128 for transferring heat from fluid that flows through the cooling system. External heat exchanger 128 is coupled to pump 126 by conduit 132 and coupled to internal heat exchanger 104 by conduit 134. External heat exchanger 128 may be a radiator-type cooling device or other appropriate type of cooling device.

External heat exchanger 128 can be mounted underneath or in front of the vehicle radiator (not shown in FIG. 1) to allow forced air to presses against external heat exchanger 128 during vehicle forward motion. The forced air that pushes against external heat exchanger 128 can dissipate heat from compressed air exiting supercharger 102, which has been transferred to fluid in the cooling system by internal heat exchanger 104. In other embodiments, external heat exchanger 128 may be mounted in different locations in the forward portion of the vehicle. Similar to internal heat exchanger 104, external heat exchanger 128 can also include an array of passageways and fins for dissipating heat in fluid flowing through external heat exchanger 128. In one embodiment, external heat exchanger 128 may be an air-to-air heat exchanger that dissipates heat in air circulating through external heat exchanger 128 through air that is forced against external heat exchanger 128 during forward motion of the vehicle. In other embodiments, the cooling system of modular supercharger system 100 may include one or more cooling system components, such as internal heat exchanger 104, pump 126, and external heat exchanger 128.

Modular supercharger system 100 further includes one or more air ducts (not shown in FIG. 1), which are coupled to supercharger 102 to provide a source of filtered air for supercharger 102. The one or more air ducts may be coupled between an air input (not shown in FIG. 1) of supercharger 102 and one or more existing air ducts (not shown in FIG. 1) in the vehicle engine compartment. Modular supercharger system 100 further includes drive belt 136 for coupling supercharger pulley 138 on supercharger 102 to engine crankshaft pulley 140 to drive supercharger 102. Modular supercharger system 100 further includes idler pulley 142 to allow proper drive belt tension and to provide sufficient belt wrap around supercharger pulley 138 to prevent drive belt slippage. In one embodiment, modular supercharger system 100 may couple supercharger pulley 138 to an existing vehicle engine drive belt to drive supercharger 102.

Figure 2:
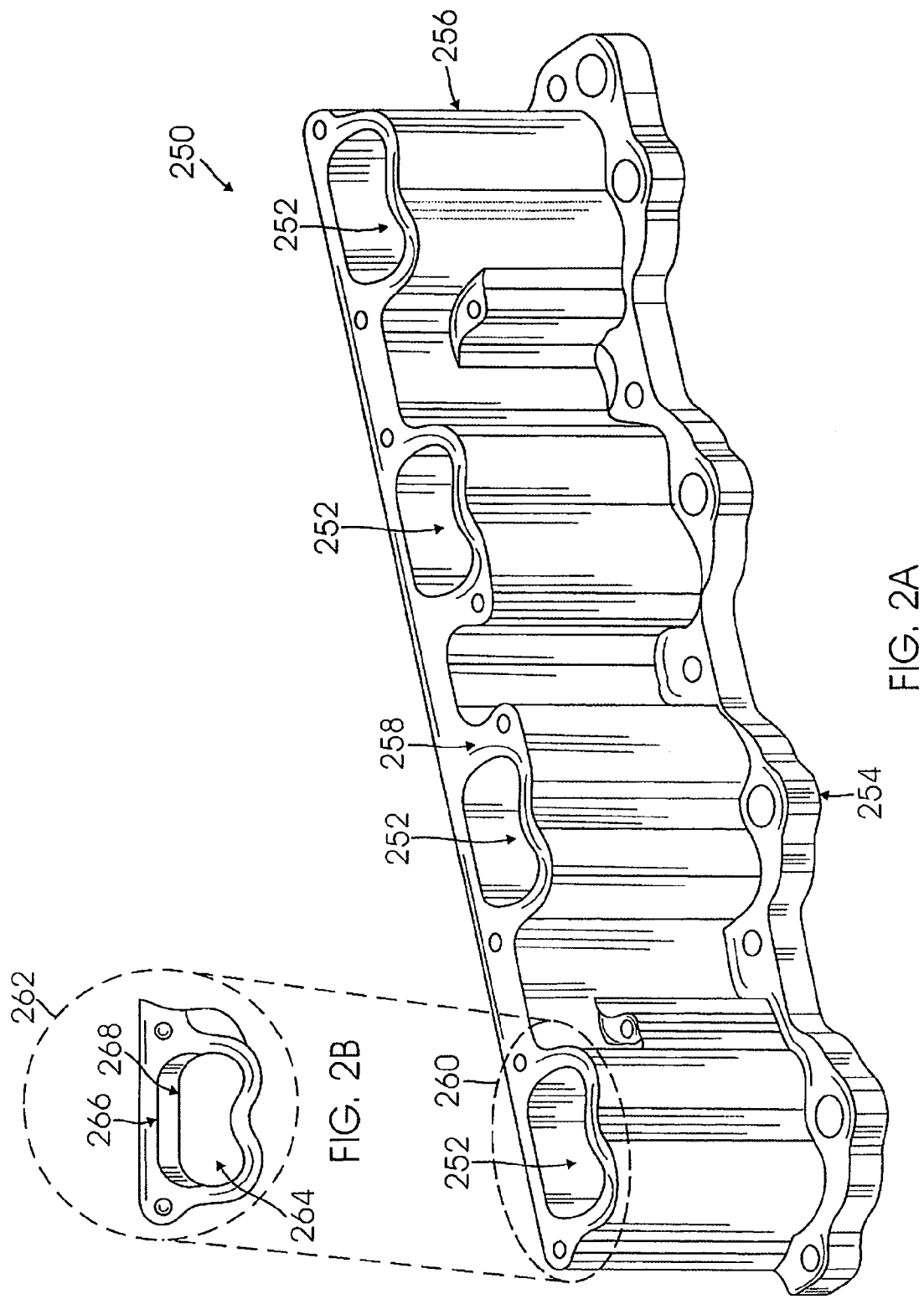
FIG. 2A illustrates a perspective view of a lower intake manifold adapter according to one embodiment of the present invention.
FIG. 2B illustrates a top view of a portion of the lower intake manifold adapter of FIG. 2A.

FIG. 2A shows a perspective view of a lower intake manifold adapter 250 in accordance with one embodiment of the present invention. Lower intake manifold adapter 250 corresponds to lower intake manifold adapter 114 in FIG. 1 and also corresponds to a mirror image of lower intake manifold adapter 112. Lower intake manifold adapter 250 includes core passageways 252, which correspond to core passageways 116 in lower intake manifold adapter 112 in FIG. 1. Lower intake manifold adapter 250 has bottom surface 254, which is attached to a cylinder head (not shown in FIG. 2A) of a vehicle engine after the intake manifold of the vehicle engine has been removed. Lower intake manifold adapter 250 may be attached to the cylinder head of the vehicle engine by bolts, for example.

Lower intake manifold adapter 250 is situated on the cylinder head of the vehicle engine such that front portion 256 of lower intake manifold adapter 250 is facing toward the front of the vehicle engine. A mounting plate, such as mounting plate 108 in FIG. 1, is attached to top surface 258 of lower intake manifold adapter 250. Core passageways 252 provide channels for compressed air from a supercharger, such as supercharger 102 in FIG. 1, to reach respective cylinder intake valves situated under each core passageway. Core passageways 252 will be described in greater detail in relation to FIG. 2B, and specifically with respect to a top view of the region enclosed by dashed line 260 (which corresponds to the region enclosed by dashed line 262 in FIG. 2B).

FIG. 2B shows a top view of region 260 of a lower intake manifold adapter 250 in FIG. 2A in accordance with one embodiment of the present invention. Region 262 in FIG. 2B, which shows a top view of region 260 in FIG. 2A, includes core passageway 264, which corresponds to passageways 252 in FIG. 2A. Core passageway 264 includes top opening 266, which is situated at top surface 258 of lower intake manifold adapter 250 in FIG. 2A, and bottom opening 268, which is situated at bottom surface 254 of lower intake manifold adapter 250. Top opening 266 is larger than bottom opening 268 such that compressed air flowing through core passageway 264 has increased pressured at bottom opening 268. In other embodiments, bottom opening 268 may be equal to or greater than top opening 266. Core passageway 264 also has rounded corners to reduce friction between the sidewalls of core passageway 264 and compressed air that flows through core passageway 264.

Figure 3:
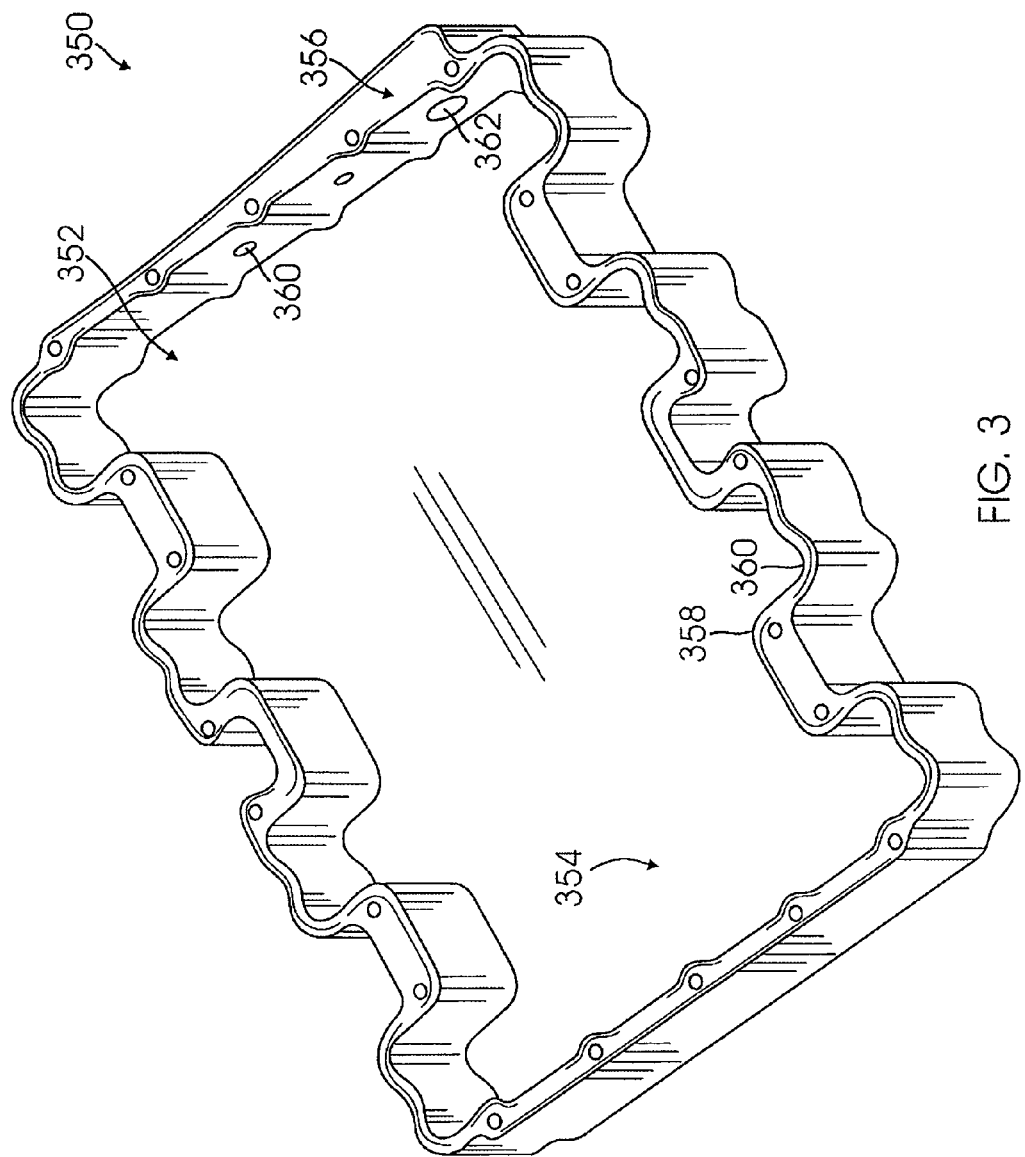
FIG. 3 illustrates a perspective view of an upper manifold plenum chamber according to one embodiment of the present invention.

FIG. 3 shows a perspective view of an upper manifold plenum chamber 350 in accordance with one embodiment of the present invention. Upper manifold plenum chamber 350 corresponds to upper manifold plenum chamber 122 in FIG. 1. Upper manifold plenum chamber 350 includes interior region 352 for housing an internal heat exchanger, such as internal heat exchanger 104, and for receiving compressed air from a supercharger, such as supercharger 102. Upper manifold plenum chamber 350 also includes top surface 354 for mounting internal heat exchanger 104. Upper manifold plenum chamber 350 further includes top surface 356 for attaching a mounting plate, such as mounting plate 108 in FIG. 1.

Upper manifold plenum chamber 350 further includes rounded inside corners, such as rounded inside corners 358 and 360, for reducing friction between the sidewall surfaces of upper manifold plenum chamber 350 and compressed air that flows into upper manifold plenum chamber 350 from supercharger 102. Upper manifold plenum chamber 350 further includes openings 360 and 362 for coupling internal heat exchanger 104 to pump 126 and external heat exchanger 128 in FIG. 1.

Figure 4:
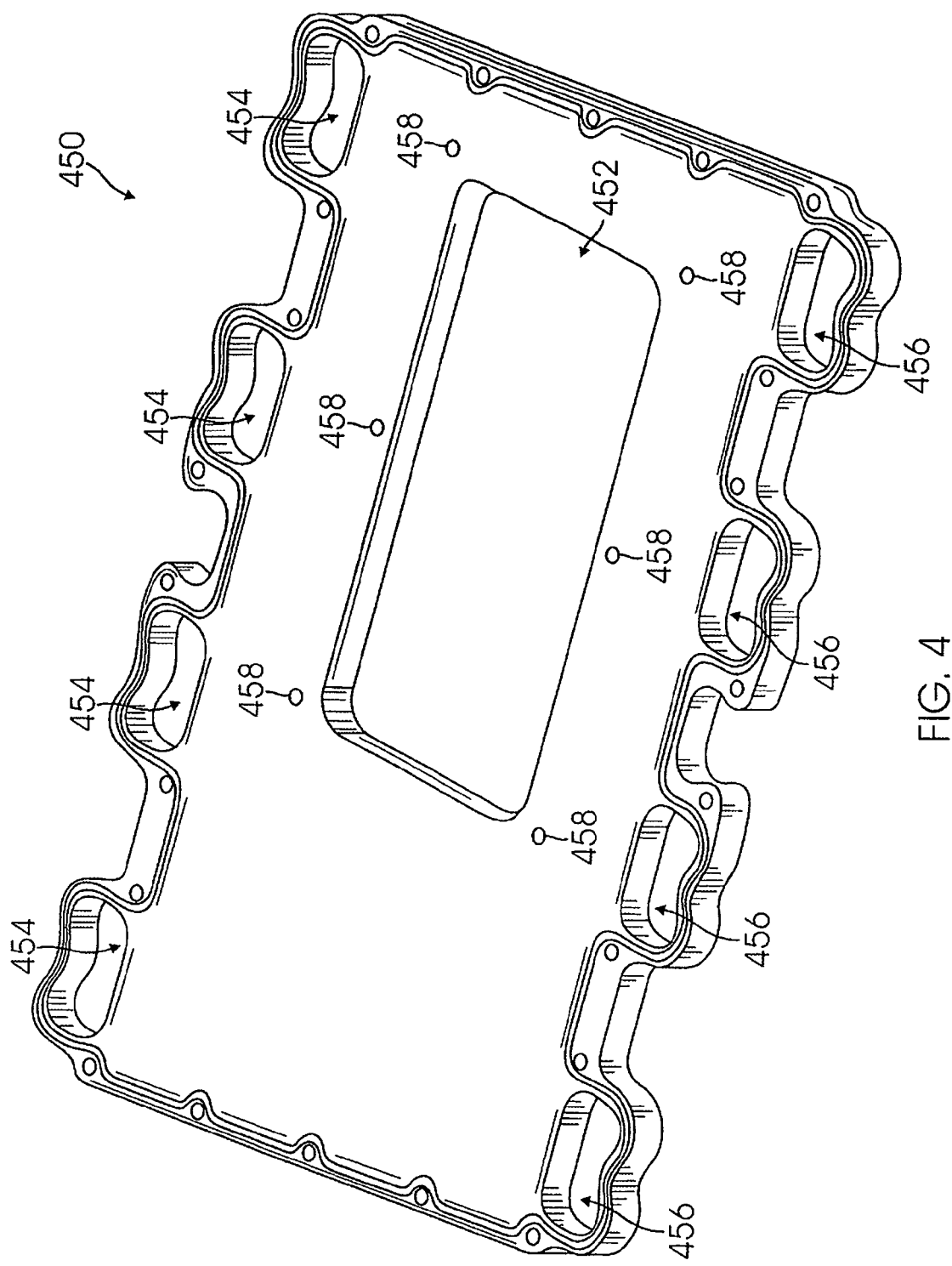
FIG. 4 illustrates a perspective view of a supercharger mounting plate according to one embodiment of the present invention.

FIG. 4 shows a perspective view of a mounting plate 450 in accordance with one embodiment of the present invention. Mounting plate 450 corresponds to mounting plate 108 in FIG. 1 and includes opening 452, which corresponds to opening 110 in FIG. 1. Mounting plate 450 is situated between lower intake manifold adapters, such as lower intake manifold adapters 112 and 114, and an upper manifold plenum chamber, such as upper manifold plenum chamber 122 in FIG. 1. Mounting plate 450 includes openings 454, which can align with core passageways 116 in lower intake manifold adapter 112 in FIG. 1 and openings 456, which can align with core passageways 252 in lower intake manifold adapter 250 in FIG. 2A (which corresponds to lower intake manifold adapter 114 in FIG. 1).

Openings 454 and 456 in mounting plate 450 allow compressed air, which has been cooled by internal heat exchanger 104 in FIG. 1, to flow from upper manifold plenum chamber 122 in FIG. 1 into respective core passageways in lower intake manifold adapters 112 and 114. Mounting plate 450 further includes holes 458 for attaching supercharger 102 to the bottom surface of mounting plate 450 such that compressed air exiting supercharger 102 flows through opening 452.

Figure 5:
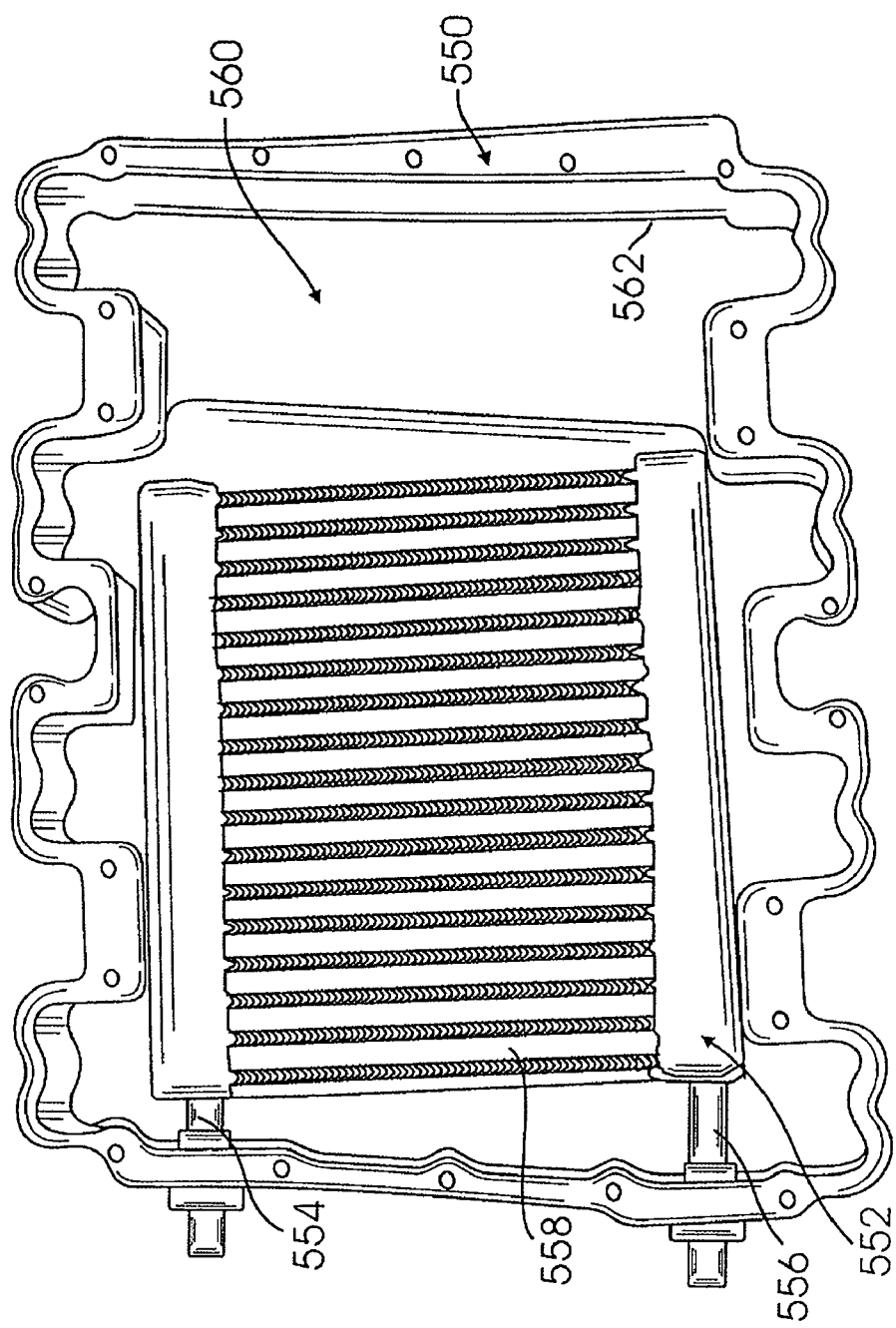
FIG. 5 illustrates a bottom view of an upper manifold plenum chamber and an internal heat exchanger according to one embodiment of the present invention.

FIG. 5 shows a bottom view of an upper manifold plenum chamber 550 including an internal heat exchanger 552 in accordance with one embodiment of the present invention. Upper manifold plenum chamber 550 corresponds to upper manifold plenum chamber 122 in FIG. 1 and upper manifold plenum chamber 350 in FIG. 3, and internal heat exchanger 552 corresponds to internal heat exchanger 104 in FIG. 1. Internal heat exchanger 552 includes input port 554 for allowing fluid to enter internal heat exchanger 552 and output port 556 for allowing fluid to exit internal heat exchanger 552. Internal heat exchanger 552 also includes passageways 558 for allowing fluid to circulate through internal heat exchanger 552.

Upper manifold plenum chamber 550 includes interior region 560 for housing an air flow distribution manifold (not shown in FIG. 5), which will be discussed in relation to FIG. 6. Upper manifold plenum chamber 550 also includes opening 562 for connecting the air flow distribution manifold to an EGR (exhaust gas recirculation) port on a vehicle engine.

Figure 6:
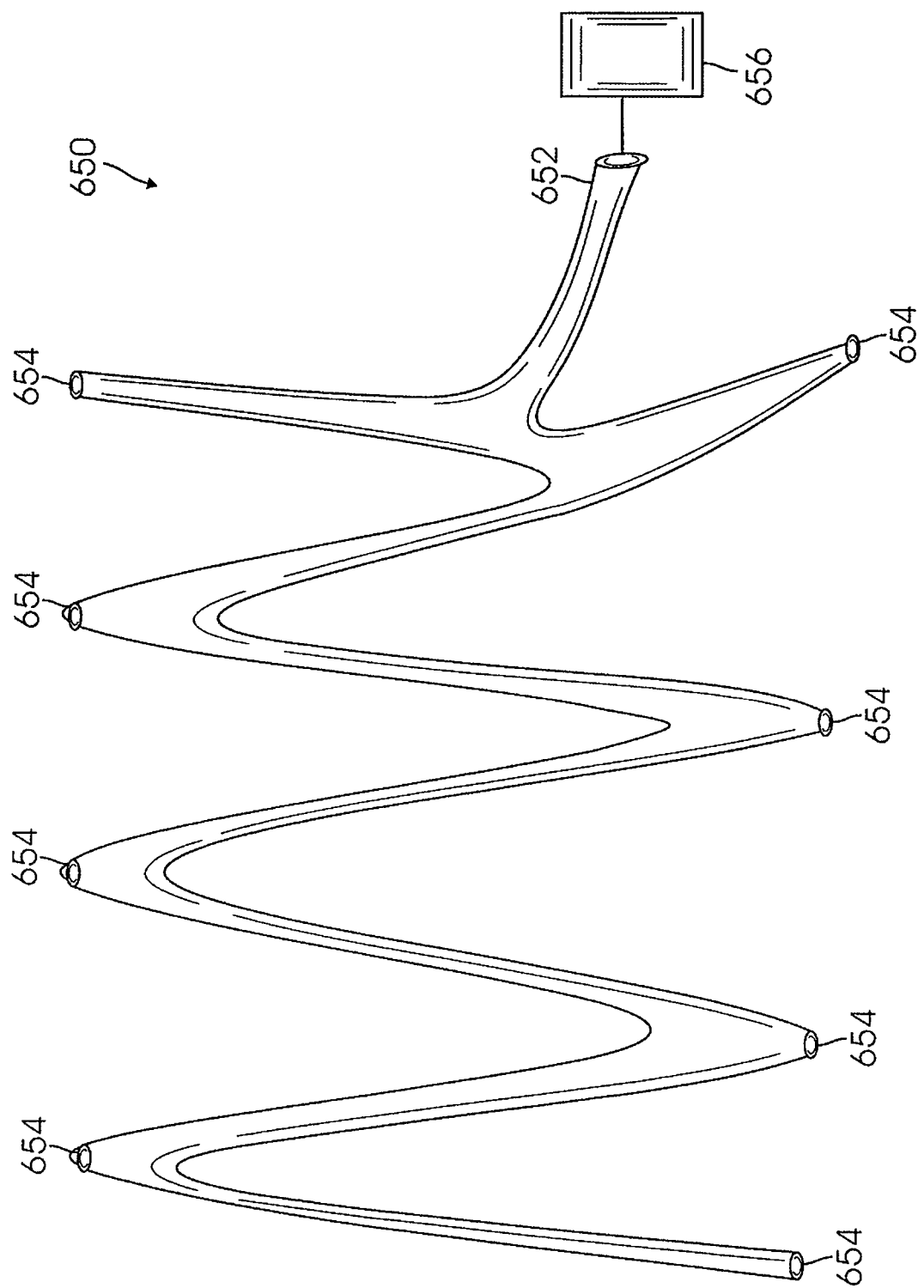
FIG. 6 illustrates a diagram of an air flow distribution manifold according to one embodiment of the present invention.

FIG. 6 shows an air flow distribution manifold 650 coupled to a regulator 656 in accordance with one embodiment of the present invention. Air flow distribution manifold 650 can be situated adjacent to an internal heat exchanger, such as internal heat exchanger 552 in FIG. 5, in an interior region of an upper manifold plenum chamber, such as interior region 560 of upper manifold plenum chamber 550. Air flow distribution manifold 650 can be a stainless steel tube and may have an inner diameter of between approximately 0.375 inch and approximately 1.25 inches. Air flow distribution manifold 650 includes end 652 for connecting to regulator 656. Regulator 656 can be connected to an EGR port on a vehicle engine (not shown in FIG. 6) to allow precise flow adjustments of exhaust gasses to optimize the efficiency and operation of the flow control and manifold operation. Regulator 656 can be an adjustable regulator, such as a needle/orifice type control having a tapered needle for air flow control, which is capable of withstanding temperatures in excess of 450.0° F. In one embodiment, a fixed orifice, which may be threaded or brazed/welded into end 652 of air flow distribution manifold 650, may be used in place of regulator 656. The fixed orifice can have a predetermined opening size to allow a desired flow rate.

Air flow distribution manifold 650 also includes exit air openings 654, which can be adjusted to achieve a balanced air flow within the upper manifold plenum chamber, such as upper manifold plenum chamber 122 of modular supercharger system 100 in FIG. 1. By achieving a balanced air flow with the upper manifold plenum chamber, air flow distribution manifold 650 can eliminate hot spots that can cause false diagnostic codes related to vehicle engine cylinder misfire and can increase the efficiency of the air charge to the vehicle engine cylinders. In other embodiments, additional exit air openings may be positioned along the perimeter of air flow distribution manifold 650 to further adjust air flow distribution.

Figure 7:
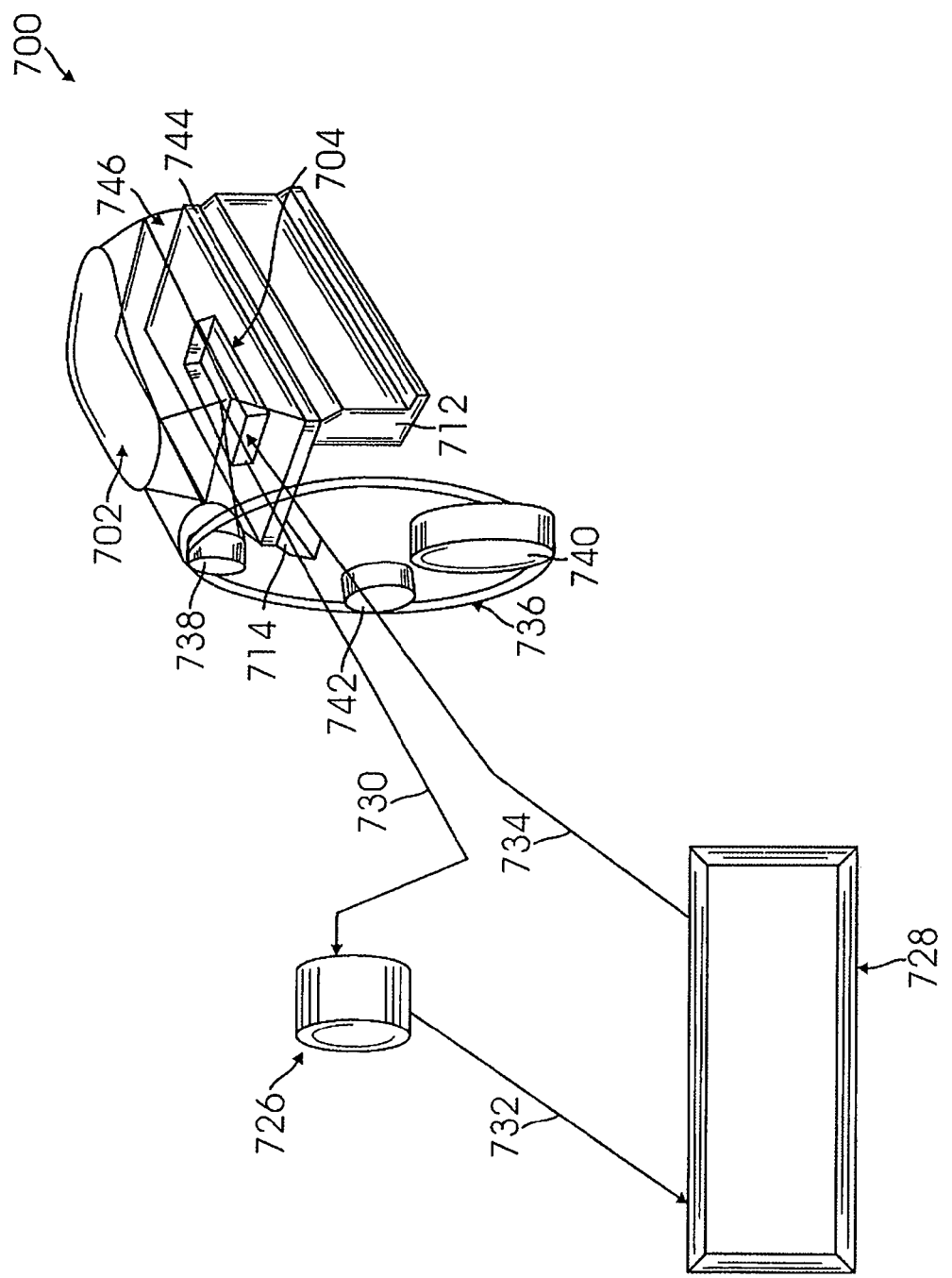
FIG. 7 illustrates a diagram of a modular supercharger system according to one embodiment of the present invention.

FIG. 7 shows a diagram of modular supercharger system 700 according to one embodiment of the present invention. In modular supercharger system 700 in FIG. 7, supercharger 702, internal heat exchanger 704, lower intake manifold adapters 712 and 714, pump 726, external heat exchanger 728, conduits 730, 732, and 734, drive belt 736, supercharger pulley 738, engine crankshaft pulley 740, and idler pulley 742 correspond, respectfully, to supercharger 102, internal heat exchanger 104, lower intake manifold adapters 112 and 114, pump 126, external heat exchanger 128, conduits 130, 132, and 134, drive belt 136, supercharger pulley 138, engine crankshaft pulley 140, and idler pulley 142 in modular supercharger system 100 in FIG. 1.

Similar to modular supercharger system 100 in FIG. 1, modular supercharger system 700 uses a modular design including a supercharger (i.e. supercharger 702) and an effective cooling system to increase performance, reduce emissions, and decrease fuel consumption of a vehicle engine (not shown in FIG. 7). Supercharger system 700 also utilizes a portion of the cooling system (i.e. internal heat exchanger 704) to reduce audible noise that is generated by the supercharger. However, in modular supercharger system 100 in FIG. 1, supercharger 102 is mounted in an updraft configuration, where compressed air is discharged from supercharger 102 in an upward direction (i.e. in a direction away from the vehicle engine). In contrast, in modular supercharger system 700, supercharger 702 is mounted in a downdraft configuration, where compressed air is discharged from supercharger 702 in a downward direction (i.e. toward the vehicle engine).

In modular supercharger system 700, supercharger 702 is mounted on upper manifold plenum chamber 746. In order to accommodate supercharger 702, upper manifold plenum chamber 746 has a opening, such as opening 10 in mounting plate 108 in FIG. 1, situated in the top surface of upper manifold plenum chamber 746 to receive compressed air from supercharger 702. Except for the opening in the top surface of upper manifold plenum chamber 746, upper manifold plenum chamber 746 is generally similar to upper manifold plenum chamber 122 in modular supercharger system 100 in FIG. 1. In modular supercharger system 700, upper manifold plenum chamber 746 is attached to mounting plate 744, which is generally similar to mounting plate 108 in modular supercharger system 100. However, since supercharger 102 is mounted to the bottom surface of mounting plate 108, mounting plate 108 requires opening 110 to allow compressed air form supercharger 102 to enter upper manifold plenum chamber 122. In contrast, since supercharger 702 is not attached to mounting plate 744, mounting plate 744 does not require an opening, such as opening 110 in mounting plate 108.

A novel system for supercharging a vehicle engine has been hereby presented. The present invention may be embodied in other specific forms without departing from its spirit or essential characteristics. The described embodiments are to be considered in all respects only as illustrative and not restrictive. Those skilled in the art will recognize that changes and modifications may be made to the embodiments without departing from the scope of the present invention. These and other changes or modifications are intended to be included within the scope of present invention, as broadly described herein.

What is claimed is:

1. A supercharging method using a supercharger system including a first and a second lower intake manifold adapter attached to a vehicle engine, an upper manifold plenum chamber situated over said first and said second intake manifold adapter, and a supercharger mounted on a top surface of said upper manifold plenum chamber, said supercharging method comprising:
   discharging compressed air from said supercharger in a downward direction;
   receiving said compressed air in said upper manifold plenum chamber;
   allowing said compressed air to flow through said first lower intake manifold adapter and said second lower intake manifold adapter to said vehicle engine;
   adjusting air flow within said upper manifold plenum chamber by using an air flow distribution manifold situated in said upper manifold plenum chamber; and
   balancing said air flow within said upper manifold plenum chamber by using a plurality of adjustable openings in said air flow distribution manifold.

2. The supercharging method of claim 1 further comprising: adjusting exhaust gas flow by using a regulator coupled between said air flow distribution manifold and said vehicle engine.

3. A supercharging method using a supercharger system including a first and a second lower intake manifold adapter attached to a vehicle engine, an upper manifold plenum chamber situated over said first and said second intake manifold adapter, and a supercharger mounted on a top surface of said upper manifold plenum chamber, said supercharging method comprising:
   discharging compressed air directly from said supercharger in a downward direction;
   receiving said compressed air in said upper manifold plenum chamber directly in said downward direction through an opening in said top surface of said upper manifold plenum chamber;
   adjusting air flow within said upper manifold plenum chamber by using an air flow distribution manifold situated in said upper manifold plenum chamber;
   balancing said air flow within said upper manifold plenum chamber by using a plurality of adjustable openings in said air flow distribution manifold; and
   allowing said compressed air to flow through said first lower intake manifold adapter and said second lower intake manifold adapter to said vehicle engine.

4. The supercharging method of claim 3 further comprising: adjusting exhaust gas flow by using a regulator coupled between said air flow distribution manifold and said vehicle engine.

5. A supercharger system for super charging a vehicle engine, said supercharger system comprising:
   a first lower intake manifold adapter for attaching to said vehicle engine;
   a second lower intake manifold adapter for attaching to said vehicle engine;
   an upper manifold plenum chamber situated over said first and said second lower intake manifold adapter, said upper manifold plenum chamber adapted to receive a supercharger; and
   an air flow distribution manifold situated in said upper manifold plenum chamber, wherein said air flow distribution manifold adjusts air flow within said upper manifold plenum chamber;
   wherein said supercharger provides compressed air that is discharged from said supercharger in a downward direction, and wherein said air flow distribution manifold comprises a plurality of adjustable openings for balancing said air flow within said upper manifold plenum chamber.

6. The supercharger system of claim 5 further comprising a plate situated between said upper manifold plenum chamber and said first and said second lower intake manifold adapter.

7. The supercharger system of claim 5, wherein said upper manifold plenum chamber has an opening in a top surface of said upper manifold plenum to allow said compressed air to flow from said supercharger into said upper manifold plenum chamber.

8. A supercharger system comprising:
   a first lower intake manifold adapter;
   a second lower intake manifold adapter;
   an upper manifold plenum chamber situated over said first and said second lower intake manifold adapter; and
   a supercharger attached to a top surface of said upper manifold plenum chamber;
   an air flow distribution manifold situated in said upper manifold plenum chamber, wherein said air flow distribution manifold adjusts air flow within said upper manifold plenum chamber;
   wherein said air flow distribution manifold comprises a plurality of adjustable openings for balancing said air flow within said upper manifold plenum chamber, and wherein said supercharger provides compressed air that is discharged directly from said supercharger in a downward direction and delivered directly in said downward direction through an opening in said top surface of said upper manifold plenum chamber.

9. The supercharger system of claim 8 further comprising a plate situated between said upper manifold plenum chamber and said first and said second lower intake manifold adapter.

10. The supercharger system of claim 8, wherein said top surface of said upper manifold plenum has said opening to allow said compressed air to flow from said supercharger into said upper manifold plenum chamber.

11. The supercharger system of claim 8 further comprising a regulator coupled to said air flow distribution manifold and a vehicle engine, wherein said regulator allows flow adjustment of vehicle engine exhaust gasses.

12. A supercharger system for super charging a vehicle engine, said supercharger system comprising:
- a first lower intake manifold adapter for attaching to said vehicle engine;
- a second lower intake manifold adapter for attaching to said vehicle engine; and
- an upper manifold plenum chamber situated over said first and said second lower intake manifold adapter, said upper manifold plenum chamber adapted to receive a supercharger;
- an air flow distribution manifold situated in said upper manifold plenum chamber, wherein said air flow distribution manifold adjusts air flow within said upper manifold plenum chamber;

wherein said air flow distribution manifold comprises a plurality of adjustable openings for balancing said air flow within said upper manifold plenum chamber, and wherein said supercharger provides compressed air that is discharged directly from said supercharger in a downward direction and delivered directly in said downward direction through an opening in a top surface of said upper manifold plenum chamber.

13. The supercharger system of claim 12 further comprising a plate situated between said upper manifold plenum chamber and said first and said second lower intake manifold adapter.

14. The supercharger system of claim 12, wherein said upper manifold plenum chamber has said opening in said top surface of said upper manifold plenum to allow said compressed air to flow from said supercharger into said upper manifold plenum chamber.

15. The supercharger system of claim 12 further comprising a regulator coupled between said air flow distribution manifold and said vehicle engine, wherein said regulator allows flow adjustment of exhaust gasses.

* * * * *